United States Patent
Mancho et al.

(10) Patent No.: US 11,242,932 B2
(45) Date of Patent: Feb. 8, 2022

(54) AIR SAMPLING SYSTEM EQUIPPED WITH AN OVERPRESSURE VALVE

(71) Applicant: LIEBHERR-AEROSPACE TOULOUSE SAS, Toulouse (FR)

(72) Inventors: Jean-Luc Mancho, Toulouse (FR); Damien Maury, Toulouse (FR); Frédéric Bristiel, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 0 days.

(21) Appl. No.: 17/053,064

(22) PCT Filed: May 2, 2019

(86) PCT No.: PCT/FR2019/051015
§ 371 (c)(1),
(2) Date: Nov. 4, 2020

(87) PCT Pub. No.: WO2019/211566
PCT Pub. Date: Nov. 7, 2019

(65) Prior Publication Data
US 2021/0108733 A1 Apr. 15, 2021

(30) Foreign Application Priority Data

May 4, 2018 (FR) ...................................... 1853858

(51) Int. Cl.
*F16K 5/04* (2006.01)
*F16K 1/22* (2006.01)
(Continued)

(52) U.S. Cl.
CPC ............ *F16K 5/0407* (2013.01); *F16K 1/222* (2013.01); *B64D 13/04* (2013.01); *B64D 13/06* (2013.01); *F16K 11/0856* (2013.01)

(58) Field of Classification Search
CPC .... F16K 5/0407; F16K 1/222; F16K 11/0856; F16K 11/074; F16K 11/0525; B64D 13/04; B64D 13/06
See application file for complete search history.

(56) References Cited

U.S. PATENT DOCUMENTS 3,386,461 A 6/1968 Fisher
3,537,510 A * 11/1970 Davison ................. B64D 13/04
165/279

(Continued)

FOREIGN PATENT DOCUMENTS

DE 2847038 5/1980
GB 1321897 7/1973

*Primary Examiner* — Michael R Reid
(74) *Attorney, Agent, or Firm* — Steven M. Greenberg, Esq.; Shutts & Bowen LLP

(57) ABSTRACT

The invention relates to an air bleed system comprising an air bleed port provided on an engine of an aircraft, an air supply pipe, a pressure sensor, a pressure relief valve mounted in said air supply pipe, characterized in that said pressure relief valve comprises: a valve body (11); a closure member (121) pivotally mounted in said air circulation duct; and an air discharge channel (13) passing through said valve body (11); at least one air discharge opening (15) formed on said upstream face of said closure member (121) and at least one air evacuation opening (19) which opens out to the outside of the air circulation duct.

10 Claims, 3 Drawing Sheets

Figure 5:
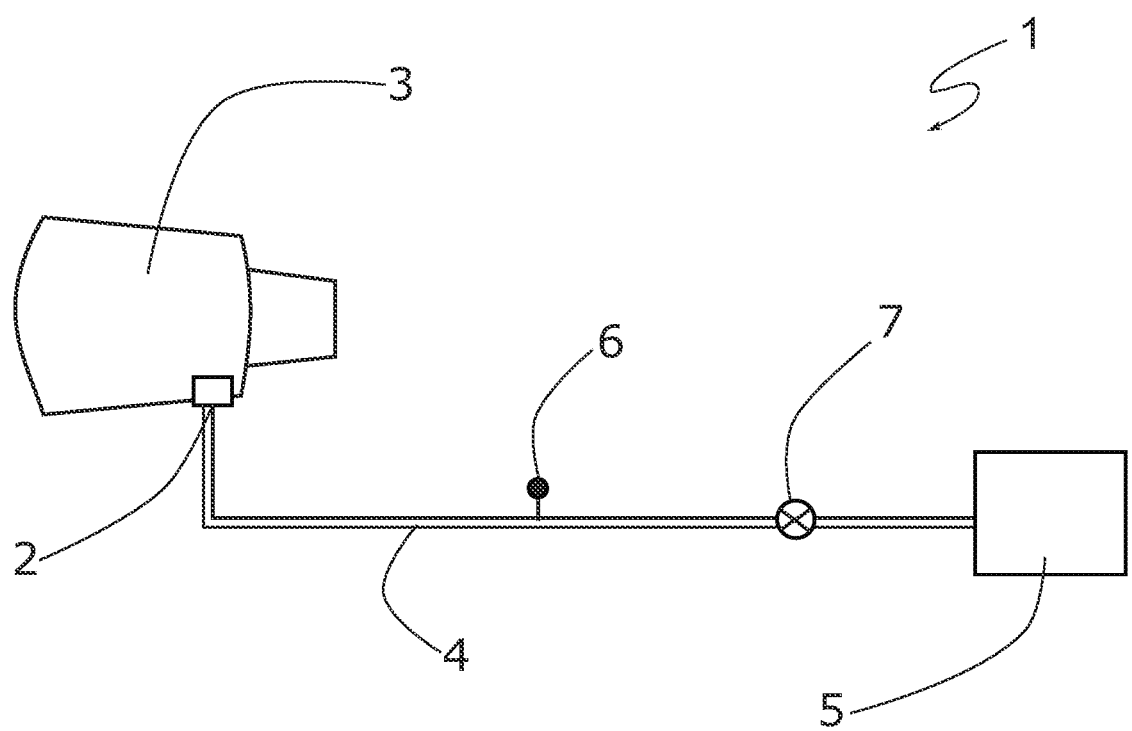

(51) Int. Cl.
 *B64D 13/04* (2006.01)
 *B64D 13/06* (2006.01)
 *F16K 11/085* (2006.01)

(56) References Cited

U.S. PATENT DOCUMENTS

| | | | |
|---|---|---|---|
| 6,058,725 | A | 5/2000 | Monfraix et al. |
| 6,161,582 | A | 12/2000 | Asano |
| 6,446,667 | B1 | 9/2002 | Wang |
| 2002/0074459 | A1 | 6/2002 | Gleine et al. |
| 2004/0250862 | A1 | 12/2004 | Maruta |

* cited by examiner

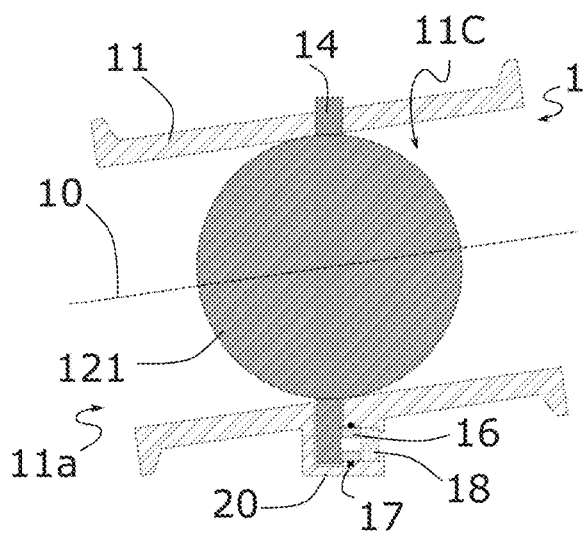
Figure 1a
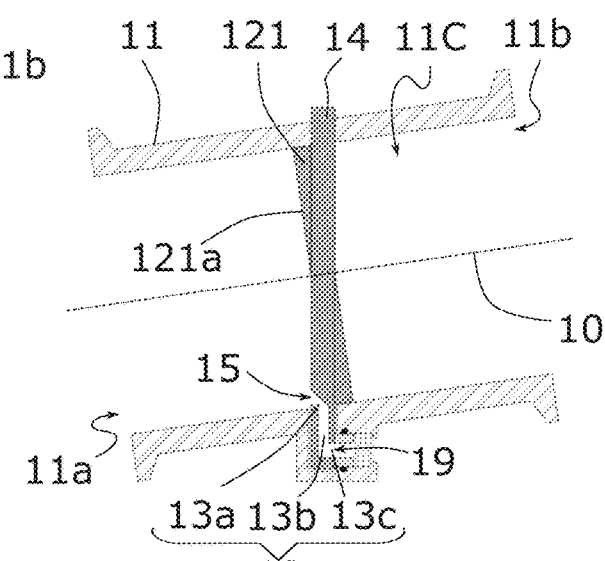
Figure 1b
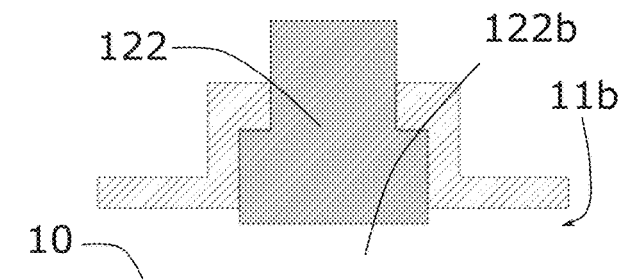
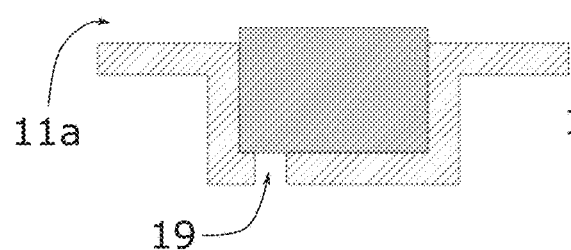
Figure 2a
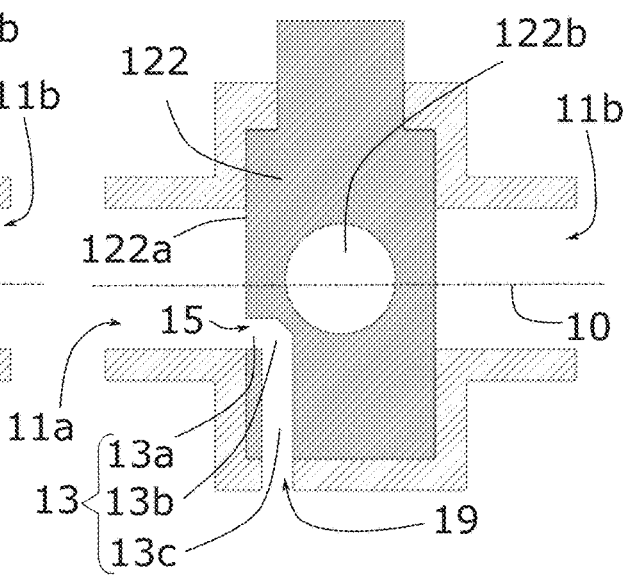
Figure 2b

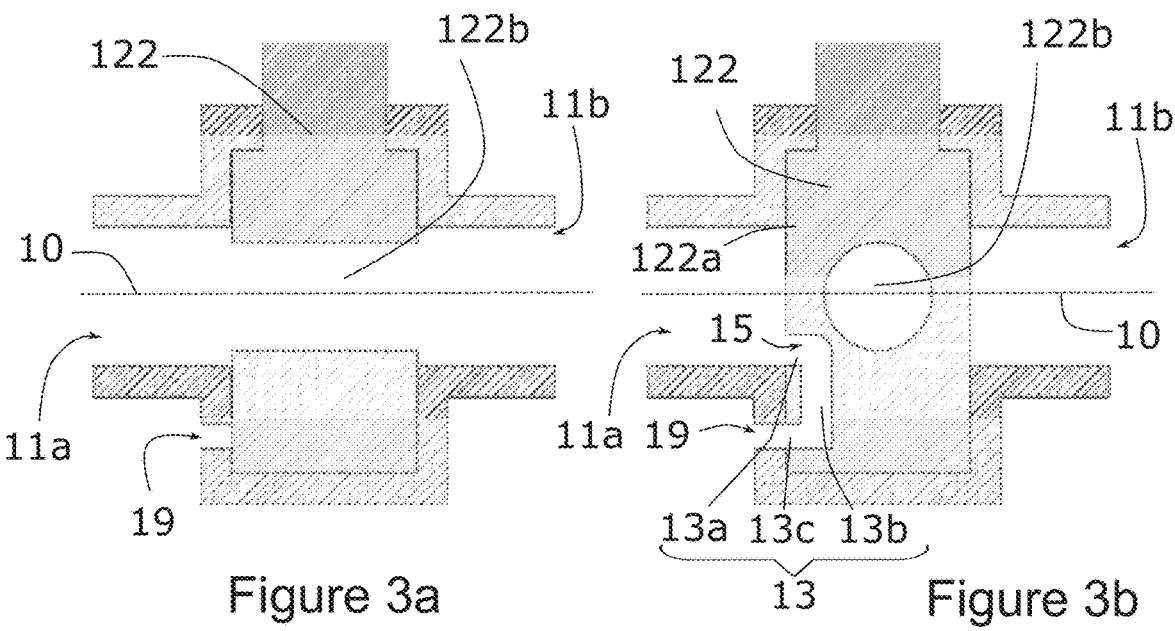
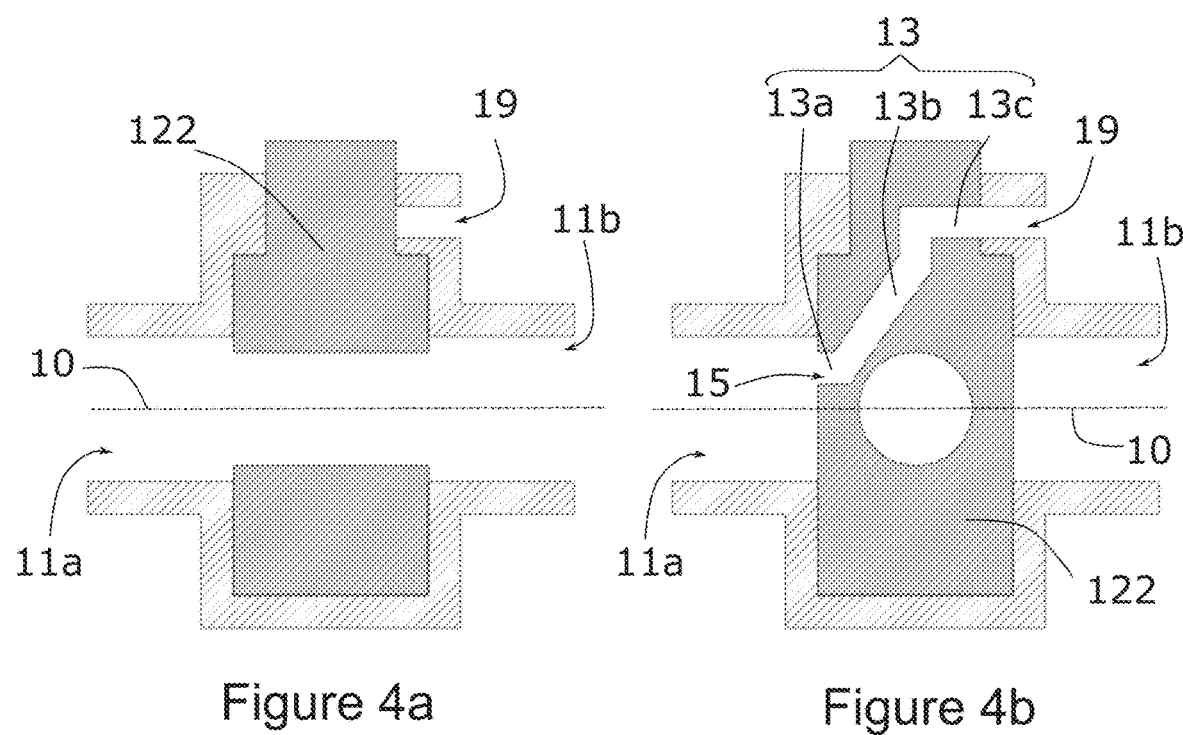

AIR SAMPLING SYSTEM EQUIPPED WITH AN OVERPRESSURE VALVE

CROSS-REFERENCE TO RELATED APPLICATIONS

This application is a § 371 national phase entry of International Application No. PCT/FR2019/051015, filed May 2, 2019, which claims priority to French Patent Application No. 1853858, filed May 4, 2018.

1. TECHNICAL FIELD OF THE INVENTION

The invention relates to an air bleed system of an aircraft equipped with a pressure relief valve. The invention relates more particularly to an air pressure relief valve intended to equip an air bleed system, for example to supply an air conditioning system of an aircraft.

2. TECHNOLOGICAL BACKGROUND

An aircraft air conditioning system, and in general, any equipment of an aircraft operating from or with an air flow, is supplied with air, directly or indirectly, by an air bleed system comprising an air bleed port provided on a propulsion engine of the aircraft, an air bleed pipe suitable for conveying the bled air toward this equipment, a pressure sensor suitable for measuring the air pressure in said bleed pipe and/or in said air equipment and a pressure relief valve (better known as an "over pressure valve" or its acronym OPV) mounted in the air bleed pipe and configured to isolate the pipe air bleed when excess pressure is detected by the pressure sensor, in order to protect the equipment. According to certain variants, the air conditioning system does not have a pressure sensor and the OPV valve switches to the closed position under the action of a calibrated valve as soon as a pressure level is reached.

Closing the pressure relief valve generates an increase in pressure in the air bleed pipe, which must be relieved in order not to exceed the admissible pressure levels.

This pressure relief is generally carried out by relief valves, better known as a "Duct Vent Valve" or its acronym DVV. These relief valves are therefore configured to be able to discharge a portion of the air blocked in the bleed pipe upstream of the pressure relief valve when this air reaches a predetermined threshold.

One of the drawbacks of current solutions lies in the fact that it is necessary to control the relief valve independently of the pressure relief valve while the discharge threshold and the closing threshold of the pressure relief valve may be identical. In other words, the relief valve can be activated for a predetermined pressure level, which is the pressure level that can control the tilting of the pressure relief valve from an open position in which air can freely flow in the air bleed pipe to a closed position in which the valve prevents any air flow to the equipment arranged downstream of the valve.

In addition, the two systems being independent of one another, they are each, independently, likely to encounter a critical failure of the integrity of the air conditioning system which they equip.

The inventors have therefore sought to develop new equipment which can simultaneously perform an isolating function of a bleed pipe and an air discharge function.

3. OBJECTIVES OF THE INVENTION

The invention aims to provide an air bleed system of an aircraft equipped with a pressure relief valve, said system overcoming at least some of the drawbacks of known air systems.

The invention aims in particular to provide an air bleed system comprising a pressure relief valve which can simultaneously perform an isolating function of an air pipe on which it is installed and an air discharge function.

The invention also aims to provide, in at least one embodiment, an air bleed system comprising a pressure relief valve configured to equip an aircraft air conditioning system.

The invention also aims to provide, in at least one embodiment of the invention, an air bleed system comprising a valve which makes it possible to reduce the costs of contemporary systems.

4. SPECIFICATION OF THE INVENTION

To do this, the invention relates to an air bleed system comprising an air bleed port provided on an engine of an aircraft, an air supply pipe designed to be in fluid communication with an air equipment of the aircraft, a pressure sensor designed to measure the air pressure in said supply pipe and/or in said air equipment, a pressure relief valve mounted in said air supply pipe and configured to block the air supply to said equipment in the event of overpressure detected by said pressure sensor.

An air bleed system according to the invention is characterized in that said pressure relief valve comprises:
- a valve body comprising an air inlet, an air outlet and an air circulation duct which is arranged between the air inlet and the air outlet and extends in a direction, called the longitudinal direction,
- a closure member pivotally mounted in said air circulation duct about a pivot axis, between an open position in which air can freely circulate from said air inlet to said air outlet, and a closed position in which said closure member has a surface, called the upstream face, which extends across the circulation duct so as to prevent any circulation of air toward said air outlet,
- at least one air discharge channel passing through said valve body configured to spontaneously fluidically connect, when said closure member is in said closed position, at least one air discharge opening formed on said upstream face of said closure member and at least one air evacuation opening which opens to the outside of the air circulation duct.

An air bleed system according to the invention comprises a valve which therefore has the particular feature of integrating an air discharge channel which is configured to put a discharge opening arranged on the upstream face of the closure member of the valve into fluid communication with an air evacuation opening which opens to the outside of the circulation duct of the valve when the valve is in the closed position, i.e. when the closure member extends across the air circulation duct, blocking any air circulation in the air circulation duct, downstream of the closure member.

Also, a closure control for the closure member (also referred to by the term "closure" hereinafter) automatically and spontaneously triggers the opening of the discharge channel, i.e. the communication of air from the discharge opening arranged on the upstream face of the closure and the air evacuation opening which opens to the outside of the circulation duct. Thus, the air blocked inside the air circulation duct upstream of the closure member can be evacuated outside the circulation duct. This air discharge is provided by the admission of air into the discharge opening formed on the upstream face of the closure member, the circulation of air in the discharge channel connected to the air evacuation opening when the valve is in the closed position, then to its release through the evacuation opening.

The discharge air is not evacuated downstream of the closure member, but outside the valve body, which makes it possible to perfectly isolate the equipment downstream of the valve, while ensuring the discharge air is blocked upstream of the closure.

Thus, an air system according to the invention no longer needs to be equipped with an additional relief valve insofar as the pressure relief valve acts at the same time as a means of isolating the supply pipe and air discharge means.

Advantageously and according to the invention, at least one discharge channel is provided in said closure member.

According to this advantageous variant, the discharge channel is fully carried by the shutter so that the pivoting of the closure from the open position to the closed position moves the discharge channel to a position in which it puts the discharge opening into fluid communication with the evacuation opening.

Advantageously, and according to the invention, at least one discharge channel comprises an upstream section supplied by said discharge opening, a downstream part designed to be in fluid communication with said air evacuation opening when said closure member is in said closed position, and an intermediate part extending between said upstream and downstream parts.

This advantageous variant makes it possible to form a discharge channel formed by a succession of at least three parts, which makes it possible to form a discharge circuit adapted to the shape of the closure member. This circuit can in particular be adapted according to the applications to the shapes and dimensions of the closure member.

Advantageously, and according to this variant, said closure member comprises a pivot shaft extending along said pivot axis, designed to be pivotally driven by a valve actuator in order to move from the open position to the closed position, said pivot shaft accommodating said upstream, intermediate and downstream parts of said discharge channel.

According to this variant, the valve comprises a pivot shaft of said closure designed to be driven by a valve actuator which accommodates an upstream part supplied by the discharge opening of the closure, a downstream part designed to be in fluid communication with the air evacuation opening when the closure is in said closed position, and an intermediate part extending between said upstream and downstream parts. The pivot shaft and the intermediate part can, for example, extend radially.

The discharge channel is therefore housed in the pivot shaft of the closure so that the channel pivots with the pivot shaft and comprises at least one upstream part, an intermediate part and a downstream part integral with one another. The upstream part opens into the discharge opening formed on the upstream face of the closure. The pivoting of the pivot shaft from the open position of the valve to the closed position of the valve makes it possible to move the parts, and in particular, the downstream part, from a position in which it is not in fluid communication with the air evacuation opening to a position in which it is in fluid communication with the evacuation opening. The evacuation opening is fixed with respect to the valve body and it is the pivoting of the pivot shaft which makes it possible to put or to not put the discharge channel in fluid communication with this evacuation opening. In other words, and according to this variant, the fluid communication interface between the air upstream of the valve and the evacuation opening is located at the downstream part.

According to another variant, the discharge channel is fixed relative to the valve body so that it is in fluid communication with the evacuation opening. Further, the closure is movably mounted around the discharge channel so that the discharge opening of the closure is in fluid communication with an inlet mouth of the discharge channel when the closure is in the closed position and is located opposite a wall of the discharge channel blocking any air circulation in the discharge channel when said closure is in the open position. In other words, and according to this variant, the fluid communication interface between the air upstream of the valve and the evacuation opening is located at the discharge opening of the closure.

Advantageously and according to the invention, said air evacuation opening is carried by a discharge nipple configured to be able to be connected to an air evacuation pipe, making it possible to evacuate the air at a distance from said valve.

This advantageous variant makes it possible to push the evacuation of discharged air at a distance from the valve by providing a discharge nipple to which an evacuation pipe can be connected. This pipe can then be arranged so as to conduct the discharged fluid to a desired discharge region.

Advantageously and according to this variant, said discharge nipple extends in a direction perpendicular to said pivot axis of the closure member.

According to another variant, said discharge nipple extends in a direction parallel to said pivot axis of the closure member.

Advantageously and according to the invention, said discharge nipple further comprises a dynamic sealing device configured to limit air leaks when said closure member is in the open position.

This advantageous variant makes it possible to limit the air leakage when the valve is in the open position and when the discharge channel is not in fluid communication with the outlet nipple. This makes it possible to seal the fluid communication interface between the air upstream of the valve and the evacuation nipple located at the downstream part.

Advantageously, and according to the invention, said dynamic sealing device comprises a tubular plug extending inside said discharge nipple, mounted slidably on a seal, for example an O-ring, and held in position against said closure member (or against the pivot shaft if the closure member comprises such a pivot shaft) by a spring.

According to another variant, the tubular plug is replaced by a sealing ring.

Advantageously, and according to the invention, said rotation shaft of said closure is carried by bearings or ball bearings.

Advantageously, and according to the invention, said pressure relief valve is a butterfly valve or a plug valve. More particularly, said closure member is a butterfly so that said valve forms a butterfly valve, or a plug so that said valve forms a plug valve.

In other words, an air bleed system according to the invention comprises a valve which is advantageously a butterfly valve, in which case the closure member is a butterfly pivotally mounted in the air circulation duct about the pivot axis or a plug valve, in which case the closure member is a valve pivotally mounted in the air circulation duct about the pivot axis.

In the case where the closure is a plug, the discharge channel is advantageously formed in the plug. In the case where the closure is a butterfly, the discharge channel is advantageously formed in the pivot shaft of the butterfly. The invention also relates to an air conditioning system for the cabin of an aircraft, or an air system for an air or rail transport vehicle, characterized, in combination, by all or some of the features mentioned above or below.

5. LIST OF FIGURES

Further aims, features and advantages of the invention will become apparent upon reading the following description, which is provided solely by way of non-restrictive example, and which refers to the appended figures, in which:

FIG. 1a is a schematic sectional view of a butterfly valve of an air bleed system according to one embodiment of the invention in the open position, FIG. 1b is a schematic sectional view of the butterfly valve of an air bleed system according to the embodiment of FIG. 1a in the closed position, FIG. 2a is a schematic sectional view of a plug valve of an air bleed system according to one embodiment of the invention in the open position, FIG. 2b is a schematic sectional view of the plug valve of an air bleed system according to the embodiment of FIG. 2a in the closed position, FIG. 3a is a schematic sectional view of a plug valve of an air bleed system according to another embodiment of the invention in the open position, FIG. 3b is a schematic sectional view of the plug valve of an air bleed system according to the embodiment in FIG. 3a in the closed position, FIG. 4a is a schematic sectional view of a plug valve of an air bleed system according to another embodiment of the invention in the open position, FIG. 4b is a schematic sectional view of the plug valve of an air bleed system according to the embodiment of FIG. 4a in the closed position, FIG. 5 is a schematic view of an air bleed system according to one embodiment of the invention.

6. DETAILED DESCRIPTION OF AN EMBODIMENT OF THE INVENTION

For the sake of illustration and clarity, the scales and proportions are not strictly adhered to in the figures.

In addition, identical, similar or analogous elements are denoted using the same reference signs throughout the figures.

The terms "axial" and "radial" are used without limitation with reference to the main axis 10 which defines the direction of air flow in the valve when the valve is in the open position. This main axis 10 extends along a direction, called the longitudinal direction.

Throughout the detailed description, the air bleed system considered comprises an air pressure relief valve. This being the case, a person skilled in the art will understand that the following teachings can be applied to any other type of air system of an aircraft, such as a ventilation system, an air conditioning system or even an air-cooling system.

FIGS. 1a and 1b schematically illustrate a valve of an air bleed system according to one embodiment of the invention, in the open and closed position, respectively. The valve according to this embodiment of the invention is a butterfly valve, i.e. a valve whose closure member is a butterfly 121.

This butterfly valve comprises a valve body 11 comprising an air inlet 11a, an air outlet 11b and an air circulation duct 11c which extends along the main axis 10. When the valve is in the open position, the air enters the valve through the air inlet 11a, circulates in the air circulation duct 11c and leaves the valve through the air outlet 11b.

The valve further comprises a butterfly 121 pivotally mounted in the air circulation duct 11c about a pivot axis which extends substantially perpendicularly to the main axis 10. This butterfly 121 is configured to be able to be moved from an open position (corresponding to FIG. 1a) to a closed position (corresponding to FIG. 1b). In the open position, shown in FIG. 1a, the air can freely circulate from the air inlet 11a to the air outlet 11b by passing either side of the butterfly 121 which then extends into the axis of the air circulation duct 11c. In the closed position, shown in FIG. 1b, the butterfly 121 has an upstream face 121a which extends perpendicularly to the main direction 10 and prevents any circulation of air toward the air outlet 11b.

The butterfly 121 is pivotally driven about its pivot axis by a valve actuator which is, for example, an electric actuator, itself controlled by a control unit associated with the air conditioning system equipped by the valve according to the invention. The valve actuator is configured to be able to cause the pivoting of a valve shaft 14 integral with the butterfly 121. This shaft 14 is, for example, mounted on bearings not shown in the figures for the sake of clarity. According to another embodiment, the bearings can be replaced by ball bearings or any equivalent means.

This valve shaft 14 accommodates, as shown schematically in FIG. 1b, an air discharge channel 13 which passes through the valve body 11. This discharge channel comprises an upstream part 13a supplied by a discharge opening 15 formed on the upstream face 121a of the butterfly 121, a downstream part 13c designed to be placed in air communication with an air evacuation nipple 20 and an intermediate part 13b which interconnects the upstream 13a and downstream 13c parts. The evacuation nipple 20 has an opening 19 for evacuating discharge air to the outside of the air circulation duct 11c.

In FIG. 1b, the valve is in the closed position. In this position, the air discharge opening 15 formed on the upstream face of the butterfly valve 121 is in fluid communication with the upstream part 13a, which is itself in fluid communication with the intermediate part 13b, which is itself in fluid communication with the downstream part 13c, which is itself in fluid communication with the air evacuation nipple 20. In other words, when the valve is in the closed position, a discharge circuit formed by the discharge opening 15, the upstream part 13a, the intermediate part 13b, the downstream part 13c and the evacuation nipple 20 which has the evacuation opening 19 enables a region upstream of the butterfly valve 121 to be placed in fluid communication with a region outside the valve body 11.

This arrangement therefore makes it possible to discharge the air present in the region upstream of the butterfly when the butterfly is closed and thus to lower the air pressure in this region.

In FIG. 1a, the valve is in the open position. In this position, the downstream part 13c is not in fluid communication with the air evacuation nipple 20. Indeed, whereas the parts are formed in the pivot shaft 14 of the butterfly 121, when the valve is in the open position, the downstream part 13c is in a position rotated by 90 degrees relative to the position of FIG. 1b so that it is no longer facing the air evacuation nipple 15.

In other words, in the open position, the air discharge opening 15 formed on the upstream face of the butterfly valve 121 is still in fluid communication with the upstream part 13a, which itself is still in fluid communication with the intermediate part 13b, which is itself always in fluid communication with the downstream part 13c. On the other hand, the downstream part 13c is no longer in fluid communication with the evacuation nipple 20. Also, the air upstream of the butterfly 121 can no longer be discharged to the outside of the valve body.

Airtightness is ensured in the open position of the valve by a tubular plug 16 which extends inside the discharge nipple 20 and which is slidably mounted on a seal, for example an O-ring 17, and held in position against the butterfly pivot shaft 14 by a spring 18. This makes it possible to limit air leaks and to prevent the air present upstream of the butterfly valve from being discharged when the valve is not in the overpressure position.

FIGS. 2*a* and 2*b* schematically show a valve according to another embodiment of the invention in the open and closed position, respectively. The valve according to this embodiment of the invention is a plug valve, i.e. a valve whose closure member is a plug 122. Such a plug comprises a plug body and a central bore 122*b* allowing air to pass through the plug body when the plug is in the open position. In FIG. 2*b*, the plug 122 is rotated 90 degrees about its pivot axis which extends perpendicularly to the main axis 10, relative to its position in FIG. 2*a*.

This valve also comprises a valve body 11 comprising an air inlet 11*a*, an air outlet 11*b* and an air circulation duct 11*c* which extends along the main axis 10. When the valve is in the open position, air enters the valve through the air inlet 11*a*, circulates in the air circulation duct 11*c*, passing through the central bore 122*b* of the plug and exits the valve through the air outlet 11*b*.

The plug 122 is configured to be movable from an open position (corresponding to FIG. 2*a*) to a closed position (corresponding to FIG. 2*b*). In the open position, shown in FIG. 2*a*, air can freely flow from the air inlet 11*a* to the air outlet 11*b*. In the closed position, shown in FIG. 2*b*, the central bore 122*b* of the plug is no longer in the axis of the circulation duct so that the valve body extends into the air circulation duct by having a surface, called the upstream face 122*a*, which prevents the passage of air towards the air outlet 11*b*.

The plug 122 accommodates a discharge channel 13 which makes it possible, when it is in the closed position, to put an air discharge opening 15 formed on the upstream face 122*a* of the plug 122 in fluid communication with an evacuation opening 19 which opens to the outside of the valve. The discharge channel 13 is formed by an upstream part 13*a* which extends in parallel with the main axis 10, a downstream part 13*c* which extends perpendicularly to the main axis 10 so that the air is evacuated radially, and an intermediate part 13*b*, which connects the upstream and downstream parts and extends overall at 45° from the main axis 10 in FIG. 2*b*.

FIGS. 3*a* and 3*b* show a variant of the valve in FIGS. 2*a* and 2*b*. The main difference in this embodiment is the embodiment of the discharge channel 13. This discharge channel 13 comprises an upstream part 13*a* and a downstream part 13*c*, which each extend in parallel with the main axis 10, and an intermediate channel 13*b*, which extends radially and connects the upstream and downstream parts. The evacuation opening 19 therefore opens, in this embodiment, in parallel with the main axis 10.

FIGS. 4*a* and 4*b* show a variant of the valve in FIGS. 2*a*, 2*b*, 3*a* and 3*c*. The main difference in this embodiment is the embodiment of the discharge channel 13. This discharge channel 13 comprises an upstream part 13*a* and a downstream part which each extend in parallel with the main axis 10, and an intermediate channel which extends obliquely, forming an elbow between the upstream and downstream parts. The evacuation opening 19 opens, in this embodiment, in parallel with the main axis 10, on the upper part of the valve.

Of course, other embodiments are possible for producing the discharge channel in the plug 122 or in the butterfly shaft 121, from the moment when the discharge channel makes it possible to put the upstream region in fluid communication with the closure member, and a region outside the valve body when the closure member is in the closed position.

FIG. 5 illustrates an air bleed system 1, comprising an engine 3 of an aircraft, from which air is taken from a bleed port 2 designed to supply the equipment 5 of the aircraft with air by means of an air supply pipe 4. A pressure sensor 6 is arranged in said air supply pipe upstream of the pressure relief valve 7 in order to be able to block the air supply to the equipment 5 of the aircraft when the sensor 6 detects excess pressure.

According to another embodiment, not shown, the sensor 6 can be arranged in said supply pipe downstream of the valve 7.

According to another embodiment, the sensor 6 measures the pressure in the equipment 5.

The sensor 6 can be of any type. According to one embodiment, the sensor 6 can be replaced by a calibrated valve directly integrated into the valve or any equivalent means.

It should also be noted that a pressure relief valve for an air bleed system according to the invention could be used on an air conditioning system of a cabin of an aircraft or even on an air conditioning system of an air or rail transport vehicle.

The invention claimed is:

1. An air bleed system comprising an air bleed port provided on an engine of an aircraft, an air supply pipe designed to be in fluid communication with an air equipment of the aircraft, a pressure sensor suitable for measuring the air pressure in said supply pipe and/or in said air equipment, a pressure relief valve mounted in said air supply pipe and configured to block the air supply to said equipment in the event of overpressure detected by said pressure sensor, wherein said pressure relief valve comprises:

a valve body comprising an air inlet, an air outlet and an air circulation duct which is arranged between the air inlet and the air outlet and extends in a direction, called the longitudinal direction, a closure member pivotally mounted in said air circulation duct about a pivot axis, between an open position in which air can freely circulate from said air inlet toward said air outlet, and a closed position in which said closure member has a surface, called the upstream face which extends across the circulation duct so as to prevent any air circulation toward said air outlet, at least one air discharge channel passing through said valve body configured to spontaneously fluidically connect, when said closure member is in said closed position, at least one air discharge opening formed on said upstream face of said closure member and at least one air evacuation opening which opens to the outside of the air circulation duct.

2. The air bleed system according to claim 1, wherein said at least one discharge channel is provided in said closure member.

3. The air bleed system according to claim 1, wherein said at least one discharge channel comprises an upstream part supplied by said discharge opening, a downstream part adapted to be able to be placed in fluid communication with said air evacuation opening when said closure member is in said closed position, and an intermediate part connecting said upstream and downstream parts.

4. The air bleed system according to claim 3, wherein said closure member comprises a pivot shaft extending along said pivot axis, designed to be pivotally driven by an actuator valve in order to move from the open position to the closed position, said pivot shaft accommodating said upstream, intermediate and downstream parts of said discharge channel.

5. The air bleed system according to claim 4, wherein said pivot shaft and said intermediate section extend radially.

6. The air bleed system according to claim 1, wherein said air evacuation opening is carried by a discharge nipple configured to be able to be connected to an air evacuation duct allowing air to be evacuated at a distance from said valve.

7. The air bleed system according to claim 6, wherein said discharge nipple extends in a direction perpendicular to said pivot axis of the closure member or in a direction parallel to the pivot axis of the closure member.

8. The air bleed system according to claim 6, wherein said discharge nipple further comprises a dynamic sealing device configured to limit air leaks when said closure member is in said open position.

9. The air bleed system according to claim 8, wherein said dynamic sealing device comprises a tubular plug extending inside said discharge nipple, slidably mounted on an O-ring and held in position against said closure member by a spring.

10. The air bleed system according to claim 1, wherein said pressure relief valve is a butterfly valve or a plug valve.

* * * * *